(12) United States Patent
Tiwari et al.

(10) Patent No.: US 11,611,796 B2
(45) Date of Patent: Mar. 21, 2023

(54) VOICE COMMAND INTEGRATION FOR LOCAL NETWORK CONNECTED DEVICES

(71) Applicant: DISH Network L.L.C., Englewood, CO (US)

(72) Inventors: Anand Tiwari, Highlands Ranch, CO (US); David Innes, Littleton, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/556,695

(22) Filed: Dec. 20, 2021

(65) Prior Publication Data

US 2023/0045888 A1 Feb. 16, 2023

Related U.S. Application Data

(60) Provisional application No. 63/232,552, filed on Aug. 12, 2021.

(51) Int. Cl.

| | |
|---|---|
| *G06F 3/00* | (2006.01) |
| *G06F 13/00* | (2006.01) |
| *H04N 5/445* | (2011.01) |
| *H04N 21/433* | (2011.01) |
| *H04N 21/238* | (2011.01) |
| *G10L 15/22* | (2006.01) |

(52) U.S. Cl.
CPC .......... *H04N 21/433* (2013.01); *G10L 15/22* (2013.01); *H04N 21/238* (2013.01); *G10L 2015/223* (2013.01)

(58) Field of Classification Search
CPC ............... H04N 21/433; H04N 21/238; G10L 2015/223; G10L 15/22
See application file for complete search history.

(56) References Cited

U.S. PATENT DOCUMENTS

| | | | | |
|---|---|---|---|---|
| 8,863,202 B2 * | 10/2014 | Agnihotri | ........ | H04N 21/41265 725/53 |
| 11,184,660 B1 * | 11/2021 | Ewanchuk | ....... | H04N 21/43635 |
| 11,227,620 B2 * | 1/2022 | Igarashi | .................. | G10L 15/20 |
| 11,330,335 B1 * | 5/2022 | Loritsch | .................. | G06F 3/165 |
| 2021/0241764 A1 * | 8/2021 | Shin | ........................ | G06F 3/167 |

* cited by examiner

*Primary Examiner* — Mulugeta Mengesha
(74) *Attorney, Agent, or Firm* — Kilpatrick, Townsend and Stockton, LLP

(57) ABSTRACT

Various arrangements for facilitating smart television content receivers in a local network are provided. A primary television receiver executing a first operating system can receive audio data including human voice from a voice enabled remote control. The primary television receiver can transmit the audio data to a secondary television receiver executing a second operating system and that includes a voice command component. The secondary television receiver can convert the audio data into voice command data and transmit the voice command data to the primary television receiver. The primary television receiver can transmit the voice command data to a voice processing server via the Internet and receive, in response, a command generated based on the voice command data. The primary television receiver can transmit the command to the secondary television receiver. The voice command component can then control an operation of the secondary television receiver based on the command.

20 Claims, 5 Drawing Sheets

VOICE COMMAND INTEGRATION FOR LOCAL NETWORK CONNECTED DEVICES

CROSS REFERENCE TO RELATED APPLICATIONS

This application claims priority to U.S. Provisional Patent Application No. 63/232,552, filed on Aug. 12, 2021, entitled "SYSTEMS AND METHODS FOR FACILITATING SMART TV CONTENT RECEIVERS IN A LOCAL NETWORK," the disclosure of which is hereby incorporated by reference in its entirety for all purposes.

BACKGROUND

Conventional technologies for over the top (OTT) devices and smart television (TV) systems face technical problems that include the requirement of Internet connections to provide media services to viewers via the Internet. Further, the technical problems include local routers experiencing disruptions, losing Internet connections, experiencing errors, requiring restarting, and/or changing IP addresses that in turn cause disruptions and degradations that prevent reliable consumer-grade audio video (A/V) services from being provided. Viewers are in need of better viewer experiences and interactive features.

Thus, there is a need for systems, methods, and processor-readable media that address the foregoing problems. This and other needs are addressed by the present disclosure.

SUMMARY

Various embodiments are described related to a method for facilitating smart television content. The method may comprise receiving, at a primary television receiver, audio data from a voice enabled remote control. The audio data may comprise human voice. The primary television receiver may execute a first operating system. The method may further comprise transmitting the audio data, from the primary television receiver to a secondary television receiver. The secondary television receiver may execute a second operating system that is different from the first operating system and may comprise a voice command component that is executed locally. The method may further comprise converting, by the voice command component of the second operating system, the audio data into voice command data. After converting the audio data into the voice command data by the voice command component of the second operating system, the method may further comprise transmitting, by the secondary television receiver, the voice command data to the primary television receiver. In response to receiving the voice command data, the method may further comprise transmitting, by the primary television receiver, the voice command data to a voice processing server via the Internet. The secondary television receiver may be connected to the Internet via only the primary television receiver. The method may further comprise receiving, at the primary television receiver from the voice processing server, a command, wherein the command is generated based on the voice command data. The method may further comprise transmitting, by the primary television receiver to the secondary television receiver, the command. The method may further comprise controlling, by the voice command component, an operation of the secondary television receiver based on the command.

Embodiments of such a method may include one or more of the following features: receiving, at the voice enabled remote control, a voice command initiation request; capturing, by the voice enabled remote control, the audio data; and transmitting the audio data from the voice enabled remote control to the primary television receiver. The method may further comprise: transmitting, from the voice enabled remote control to the secondary television receiver via the primary television receiver, the voice command initiation request; and initiating, by the voice command component, an audio data listener.

In some embodiments, the primary television receiver includes a television frequency tuner configured to tune to one of a plurality of frequencies corresponding to a plurality of television channels. In some embodiments, controlling the operation of the secondary television receiver based on the command comprises: generating a tuning request based on the command, the tuning request including a request for the television frequency tuner to tune to a television channel; transmitting the tuning request from the secondary television receiver to the primary television receiver; tuning the television frequency tuner to a frequency associated with the television channel; and transmitting a video stream from the primary television receiver to the secondary television receiver, the video stream being received by the television frequency tuner at the frequency associated with the television channel.

In some embodiments, the primary television receiver is communicatively coupled with a satellite antenna configured to receive the plurality of frequencies and the primary television receiver receives the video stream from the satellite antenna via a satellite link. In some embodiments, the primary television receiver is connected to the secondary television receiver within a local area network separate from the Internet. In some embodiments, the primary television receiver and the secondary television receiver are communicatively coupled using a universal serial bus. In some embodiments, the primary television receiver and the secondary television receiver are communicatively coupled using a coaxial cable. In some embodiments, the primary television receiver and the secondary television receiver are communicatively coupled using a wireless network. In some embodiments, the audio data is received by the secondary television receiver in a first format and the method further comprises: converting the audio data in the first format to a second format; and transmitting the audio data in the second format to the voice command component.

In some embodiments, a smart television system is described. The system may comprise a primary television receiver operating using a first operating system. The primary television receiver may be configured to receive audio data including a recording of a human voice; receive voice command data; transmit the voice command data to a voice processing server over a wide area network connection; and receive a command input from the voice processing server, wherein the command input is generated based on the voice command data. The system may further comprise a secondary television receiver operating using a second operating system different from the first operating system. The second operating system may comprise a voice command module and be configured to: receive the audio data from the primary television receiver over a local area network connection separate from the wide area network connection; convert, by the voice command module, the audio data into voice command data; transmit, by the voice command module, the voice command data to the primary television receiver; receive, by the voice command module, the command input from the primary television receiver; and control, by the voice command module, an operation of the secondary television receiver based on the command input.

Embodiments of such a system may include one or more of the following features: a voice enabled remote control configured to: capture the audio data in response to receiving a voice command initiation request; and transmit the audio data to the primary television receiver. The system may further comprise a satellite antenna communicatively coupled to the primary television receiver configured to provide a plurality of television channel frequencies to a television frequency tuner of the primary television receiver. The secondary television receiver may be further configured to: generate a tuning request based on the command input, including a request for the television frequency tuner to tune to a television channel; and transmit the tuning request to the primary television receiver. The primary television receiver may be further configured to: tune, in response to receiving the tuning request from the secondary television receiver, the television frequency tuner to a television channel frequency of the plurality of television channel frequencies associated with the television channel; and transmit a video stream to the secondary television receiver, the video stream being received by the television frequency tuner from the satellite antenna at the television channel frequency.

The system may further comprise a television communicatively coupled to the secondary television receiver, wherein the secondary television receiver is configured to transmit digital data for display by the television. In some embodiments, the primary television receiver and the secondary television receiver are communicatively coupled by a universal serial bus. In some embodiments, the primary television receiver and the secondary television receiver are communicatively coupled by a coaxial cable.

In some embodiments, a method for facilitating smart television content receivers in a local network is described. The method may comprise receiving, at a secondary television receiver, audio data comprising human voice from a voice enabled remote control. The secondary television receiver may comprise a voice command component. The method may further comprise converting, by the voice command component of the secondary television receiver, the audio data into voice command data. After converting the audio data into the voice command data by the voice command component, the method may further comprise transmitting, by the secondary television receiver, the voice command data to a primary television receiver. In response to receiving the voice command data, the method may further comprise transmitting, by the primary television receiver, the voice command data to a voice processing server via the Internet. The secondary television receiver may be connected to the Internet via only the primary television receiver. The method may further comprise receiving, at the primary television receiver from the voice processing server, a command, wherein the command is generated based on the voice command data. The method may further comprise transmitting, by the primary television receiver to the secondary television receiver, the command. The method may further comprise controlling, by the voice command component, an operation of the secondary television receiver based on the command

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Various embodiments according to the present disclosure may provide for smart TV content receivers for a local network that may correspond to non-OTT (over the top) solutions. OTT devices require Internet connections to provide media services to viewers via the Internet. However, smart TV content receivers disclosed herein may provide non-OTT solutions that enable device operation content streaming without an Internet connection.

Smart TV content receivers may be configured for local computing environments, such as particular home computing networks, that may include one or more primary television receivers (PTRs) and one or more secondary television receivers (STRs). Secondary television receivers in accordance with disclosed embodiments may be able to operate and stream audio video (A/V) content without communicating directly to a cloud server or the Internet. Instead, each secondary television receiver may obtain the majority or all of its content from a primary television receiver with which the secondary television receiver forms a closed relationship in the local computing network.

While secondary television receivers may be able to obtain and stream content from a primary television receiver, the lack of a direct connection to the internet or a cloud server may make it difficult to provide one or more other services at the secondary television receivers. For example, some secondary television receivers may include voice command processing capabilities not otherwise available to a primary television receiver. However, an Internet connection may be necessary to enable such voice command capabilities at a secondary television receiver. Accordingly, special provisions and integrations between a primary television receiver and one or more secondary television receivers may be made to enable the voice command processing capabilities.

Figure 1:
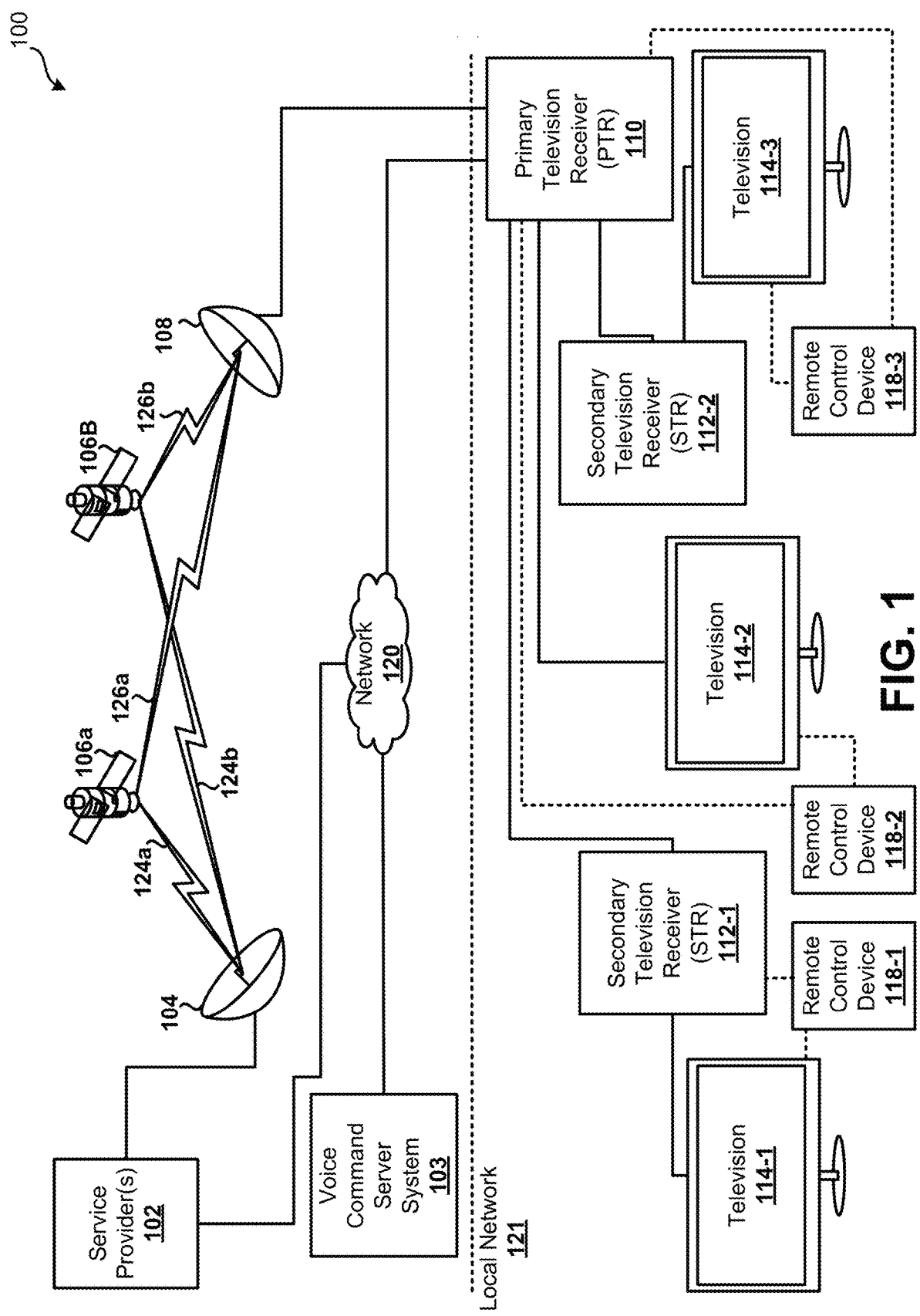
FIG. 1 illustrates an embodiment of a smart television content system for voice command integrated devices.

Further detail regarding voice command integration in primary and secondary television receivers is provided in relation to the figures. FIG. 1 illustrates an embodiment of a smart television content system 100 for voice command integrated devices. For brevity, system 100 is depicted in a simplified and conceptual form, and may generally include more or fewer systems, devices, networks, and/or other components as desired. Further, number and type of features or elements incorporated within system 100 may or may not be implementation-specific, and at least some of the aspects of system 100 may be similar to a cable television distribution system, an IPTV (Internet Protocol Television) content distribution system, and/or any other type of media or content distribution system.

System 100 may include service provider 102, satellite uplink 104, satellites 106a-b, satellite dish 108, Primary Television Receiver (PTR) 110, Secondary Television Receivers (STRs) 112, televisions 114, remote control devices 118, and voice command server system 103. As disclosed herein, primary television receiver 110 and secondary television receivers 112 may correspond to smart TV content receivers. Televisions 114 may correspond to smart TVs.

System 100 may also include at least one network 120 that may facilitate bi-directional communication for data transfer between two or more of primary television receiver 110, service provider 102, and voice command server system 103. Network 120 is intended to represent any number of terrestrial and/or non-terrestrial network features or elements. For example, network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular network, or any other type of communication network configured such that data may be transferred between and among respective elements of the system 100.

System 100 may also include at least one local network 121 that establishes a bi-directional communication path for data transfer between and among primary television receiver 110, secondary television receivers 112, and televisions 114 of the example system 100. Local network 121 may correspond to a home computing environment. Primary television receiver 110, together with secondary television receivers 112 and televisions 114, may each be incorporated within or form at least a portion of a particular home computing network.

Primary television receiver 110 and secondary television receivers 112 may correspond to television receivers, television converters, etc., such as a set-top box (STB) for example, configured as smart TV content receivers. In another example, primary television receiver 110 and secondary television receivers 112, may exhibit functionality integrated as part of or into a television, a DVR (Digital Video Recorder), a computer such as a tablet computing device, or any other computing system or device, as well as variations thereof. Further, primary television receiver 110 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. For example, as disclosed further herein, one or more of the various elements or components of the local network 121 may be configured to communicate in accordance with the MoCA® (Multimedia over Coax Alliance) home entertainment networking standard. Still other embodiments are possible.

In practice, satellites 106a-b may each be configured to receive uplink signals 124a-b from satellite uplink 104. In this example, each of uplink signals 124a-c may contain one or more transponder streams of particular data or content, such as one or more particular television channels, as supplied by service provider 102. For example, each of the respective uplink signals 124a-c may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 106a-b.

Satellites 106a-b may further be configured to relay uplink signals 124a-b to satellite dish 108 as downlink signals 126a-b. Similar to uplink signals 124a-b, each of downlink signals 126a-b may contain one or more transponder streams of particular data or content, such as various encoded and/or at least partially electronically scrambled television channels, on-demand programming, etc., in accordance with an allotted carrier frequency and bandwidth. Downlink signals 126a-b, however, may not necessarily contain the same or similar content as a corresponding one of uplink signals 124a-b. For example, uplink signal 124a may include a first transponder stream containing at least a first group or grouping of television channels, and downlink signal 126a may include a second transponder stream containing at least a second, different group or grouping of television channels. In other examples, the first and second group of television channels may have one or more television channels in common. In sum, there may be varying degrees of correlation between uplink signals 124a-b and downlink signals 126a-b, both in terms of content and underlying characteristics. Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, etc.

Satellite dish 108 may be provided to receive television channels (e.g., on a subscription basis) provided by service provider 102, satellite uplink 104, and/or satellites 106a-b. For example, satellite dish 108 may be configured to receive particular transponder streams, or downlink signals 126a-b, from one or more of satellites 106a-b. As another example, satellite dish 108 may be configured to provide a plurality of television channel frequencies to a television frequency tuner of primary television receiver 110. Additionally, primary television receiver 110, which is communicatively coupled to satellite dish 108, may subsequently select via a tuner, decode, and relay particular transponder streams to television 114-2 for display thereon. For example, satellite dish 108 and primary television receiver 110 may, respectively, be configured to receive, decode, and relay at least one premium HD-formatted television channel to television 114-2. As another example, primary television receiver 110 may be configured to tune a television frequency tuner to a television channel frequency of a plurality of television channel frequencies received by satellite dish 108. Programming or content associated with the HD channel may generally be presented live, or from a recording as previously stored on, by, or at primary television receiver 110. Here, the HD channel may be output to television 114-2 in accordance with the HDMI/HDCP content protection technologies. Other embodiments are however possible. For example, the HD channel may be output to television 114-1 in accordance with the MoCA® (Multimedia over Coax Alliance) home entertainment networking standard via secondary television receiver 112-1.

Further, primary television receiver 110 may select via a tuner, decode, and relay particular transponder streams to one or both of secondary television receivers 112, which may in turn relay particular transponder streams to a corresponding television of televisions 114 for display thereon. For example, satellite dish 108 and primary television receiver 110 may, respectively, be configured to receive, decode, and relay at least one television channel to television 114-1 by way of secondary television receiver 112-1. Similar to the above-example, the television channel may be presented live, or from a recording as previously stored on primary television receiver 110, and may be output to television 114-1 by way of secondary television receiver 112-1 in accordance with a particular content protection technology and/or networking standard.

As disclosed above, primary television receiver 110 and secondary television receivers 112 may be configured with a client-server architecture within the local network 121. Each secondary television receiver 112 may operate and stream A/V content without communicating directly to a cloud server (e.g., without communicating to a remote system via the network 120). Each secondary television receiver 112 may obtain the majority or all of its content from primary television receiver 110 with which the secondary television receiver 112 is communicatively coupled (e.g., via one or a combination of MoCA, Wi-Fi, and/or the like) in local network 121. In some examples, each secondary television receiver 112 may obtain OTA updates and smart TV OS-specific file format packages from primary television receiver 110.

Remote control devices 118 may be an electronic device such as a TV remote or a universal remote configured to receive an input from a user of the device and transmit a corresponding command to another device in system 100. Additionally or alternatively, remote control devices 118 may include software implementations of more traditional remote functionalities. For example, remote control devices 118 may be mobile device tablet computers, laptop computers, etc., executing a software application configured to receive inputs from a user corresponding to the inputs on a traditional remote and transmit corresponding commands to one of multiple intended devices in system 100.

Remote control devices 118 may include speakers and/or microphones configured to enable bi-directional audio communication between remote control devices 118 and other devices in system 100. For example, remote control devices 118 may be configured to record audio, such as human speech, and transmit the recorded audio to one or more devices in system 100 for additional processing. In some embodiments, the audio recording is processed to identify one or more voice commands, as described further below. For example, a user may use their voice to change a channel, adjust the volume, and/or interact with a voice assistant by speaking into one of remote control devices 118. In some embodiments, the audio recording is transmitted to voice command server system 103 for translation and interpretation. For example, primary television receiver 110 may transmit a pre-processed version of the audio recording to voice command server system 103 via network 120, at which point voice command server system 103 may translate the audio recording into text and interpret the text in order to determine an appropriate response. Voice command server system 103 may then transmit the appropriate response, such as a device command or an informational response, back to primary television receiver 110 for additional action.

Remote control devices 118 may be configured to communicate with any one or more devices in system 100. For example, remote control device 118-2 and 118-3 may each be in communication with television 114-2 and television 114-3, respectively, in addition to primary television receiver 110. As another example, remote control device 118-1 may only be in communication with television 114-1 and secondary television receiver 112-1. Configuring remote control devices 118 to be in communication with multiple different devices may allow for optimized communication of commands intended for specific devices. For example, remote control device 118-1 may be configured to transmit volume related commands directly to television 114-1 while transmitting channel related commands directly to secondary television receiver 112-1. It should be understood, that any of remote control devices 118 may send any combination or type of command to any combination of other devices in system 100. For example, remote control device 118-1 may transmit volume related commands to primary television receiver 110, which may then be relayed to television 114-1 in order to take effect.

Remote control devices 118 may use any one or a combination of communication methods to transmit commands to other devices of system 100. For example, remote control devices 118 may use a line-of-sight communication method, such as infrared technology, to communicate with one or more devices in system 100, such as televisions 114. As another example, remote control devices 118 may use a radio frequency communication method, such as ZigBee® RF4CE or Bluetooth®, to communicate with one or more other devices in system 100, such as primary television receiver 110 and/or secondary television receivers 112. In some embodiments, remote control devices 118 may communicate over local network 121. For example, remote control device 118-1 may be an application executing on a mobile device configured to use TCP/IP protocols to communicate with other devices on local network 121.

Figure 2:
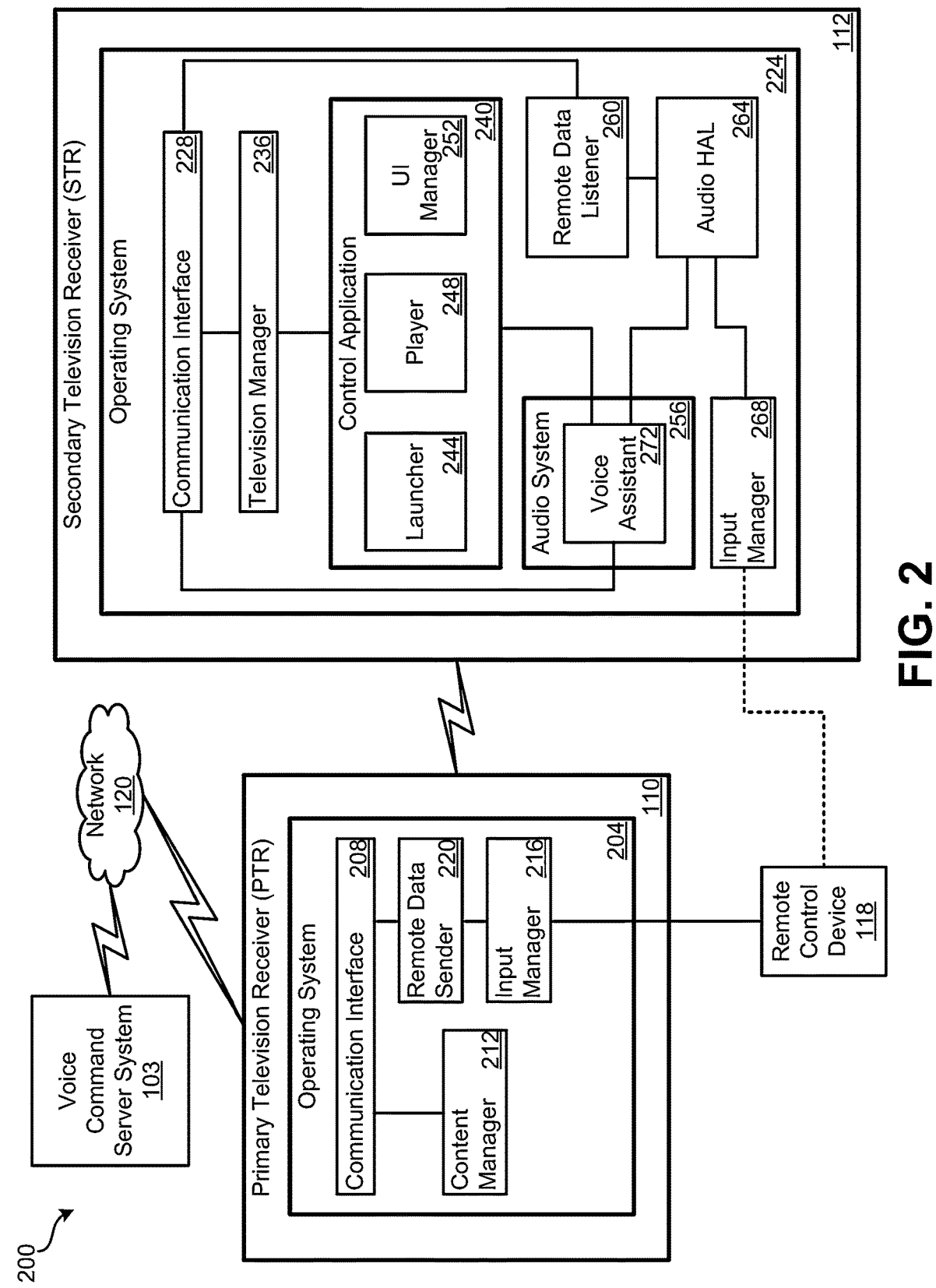
FIG. 2 illustrates an embodiment of a smart television receiver system for voice command integrated devices connected over a local network.

FIG. 2 illustrates an embodiment of a smart television receiver system 200 for voice command integrated devices connected over a local network. Smart television receiver system 200 includes voice command server system 103, primary television receiver 110, secondary television receiver 112, and remote control device 118. Smart television receiver system 200 also includes network 120 that may facilitate bi-directional communication between primary television receiver 110 and voice command server system 103. In some embodiments, primary television receiver 110 is part of multiple different networks. For example, primary television receiver 110 may communicate with voice command server system 103 via the Internet. Additionally or alternatively, primary television receiver 110 may communicate with secondary television receiver 112 via a local network.

In some embodiments, primary television receiver 110 may provide a connection between network 120 and secondary television receiver 112. For example, primary television receiver 110 may be configured to route outgoing data transmitted from secondary television receiver 112 to the appropriate network address and route incoming data to secondary television receiver 112 in response. Connecting primary television receiver 110 and secondary television receiver 112 to each other within a local network may alleviate numerous technical problems that may include local routers experiencing disruptions, losing Internet connections, and/or devices with conflicting IP addresses.

Primary television receiver 110 may operate using a first operating system 204. First operating system 204 may include system level software that manages various hardware and software resources of primary television receiver 110. For example, first operating system 204 may include one or more drivers configured to control hardware and/or software based television frequency tuners on-board primary television receiver 110 and configured to tune to one of a plurality of frequencies corresponding to a plurality of television channels. Additionally, or alternatively, first operating system 204 may include drivers configured to control one or more functions of external devices, such as a satellite antenna, to which primary television receiver 110 is connected. In some embodiments, first operating system 204 is a Linux-based operating system that configures primary television receiver 110 to function as a smart TV content receiver and provider. For example, primary television receiver 110 may receive digital content from a remote service via a satellite antenna and distribute the digital content to one or more devices connected to primary television receiver 110, such as secondary television receiver 112, via a network and/or direct connection. This may be the case, for example, secondary television receiver 112 does not include television frequency tuners and/or a direct connection to the Internet.

First operating system 204 can include one or more processes and/or services including communication interface 208, content manager 212, input manager 216, and remote data sender 220. The one or more services of first operating system 204 may configure primary television receiver 110 to operate as a server type device within a client-server network architecture. For example, primary television receiver 110 may provide software services, interfaces, and additional processing support to secondary television receiver 112 in response to requests from secondary television receiver 112. Additionally or alternatively, the one or more services provided by first operating system 204 may configure primary television receiver 110 to function as a content distribution and/or content management device. For example, one or more processes of first operating system 204 may receive and/or store content from a remote source, such as service provider 102 as described above, and distribute requested content to one or more devices such as secondary television receiver 112 or television 114.

Communication interface 208 may be used by primary television receiver 110 to communicate with one or more networks. In some embodiments, communication interface 208 configures primary television receiver 110 to communicate with other devices in a local area network (LAN). For example, primary television receiver 110, secondary television receiver 112, and/or television 114, as described above, may be part of a LAN, such as local network 121, as described above. Each device connected within the LAN may be able to communicate with other devices connected to the LAN. For example, secondary television receiver 112 may transmit content requests to primary television receiver 110 over the LAN and receive the requested content in response. Communication interface 208 may further configure primary television receiver 110 for communication within a link-local architecture. For example, communication interface 208 may configure primary television receiver 110 with one or more link-local IP addresses for use within the local network 121.

Additionally or alternatively, communication interface 208 may configure primary television receiver 110 to communicate with other devices and/or services in a wide area network (WAN), such as network 120 or the Internet. For example, primary television receiver 110, voice command server system 103, and/or service provider 102, as described above, may communicate via a WAN, such as network 120. Communication interface 208 may be further configured as a router for data transmission between devices within the local network 121 and other devices and services connected to the WAN. For example, communication interface 208 may receive data from secondary television receiver 112, determine that the data is to be transmitted to a remote device and/or service, such as voice command server system 103, and transmit the data via network 120 to voice command server system 103. As another example, communication interface 208 may receive data from a remote server and/or service, such as voice command server system 103, via network 120, determine that the data is to be transmitted to a device within local network 121, such as secondary television receiver 112, and transmit the data to secondary television receiver 112.

In some embodiments, communication interface 208 includes a wired network interface. The wired network interface may configure primary television receiver 110 to transmit and/or receive data across a LAN and/or a WAN using a physical connection. For example, primary television receiver 110 may be communicatively coupled with network 120 via an Ethernet cable or other similarly suitable cable for data transmission. As another example, primary television receiver 110 may be communicatively coupled to a satellite antenna via a coaxial cable. In yet another example, primary television receiver 110 may be coupled to one or more secondary television receivers 112 via a USB or coaxial cable. In some embodiments, communication interface 208 includes a wireless network interface. The wireless network interface may configure primary television receiver 110 to communicate wirelessly with other devices and/or services. For example, primary television receiver 110 may communicate with secondary television receiver 112 via a Wi-Fi connection. As another example, primary television receiver 110 may receive wireless communications from remote control device 118 via an RF4CE and/or a Bluetooth® connection.

Content manager 212 may configure primary television receiver 110 to receive and distribute digital content to one or more devices of the smart television receiver system 200. For example, content manager 212 may request and receive digital content, such as shows, movies, and/or television channels, from a service provider, such as service provider 102 as described above. Content manager 212 may then transmit the digital content to another device, such as secondary television receiver 112 or television 114, and/or store the digital content in a storage medium for future access. Content manager 212 may be further configured to provide services to manage TV sessions associated with one or more secondary television receivers, such as secondary television receiver 112, and to provide connection ID management.

Input manager 216 may configure primary television receiver 110 to receive and process user inputs from one or more devices. For example, input manager 216 may receive and process inputs from remote control device 118. In some embodiments, input manager 216 receives predefined commands from remote control device 118. For example, remote control device 118 may include a plurality of buttons, which when pressed by an operator of remote control device 118, cause remote control device 118 to transmit a command with a unique identifier. When input manager 216 receives the unique identifier associated with the command, input manager 216 may cause primary television receiver 110 to execute a predefined function, such as stopping, starting, rewinding, and/or fast-forwarding a currently displayed digital content.

In some embodiments, input manager 216 may receive inputs from multiple remote control devices. For example, remote control device 118 associated with secondary television receiver 112, and another remote control device associated with another secondary television receiver, may both transmit commands to input manager 216. In this example, input manager 216 may determine, based on an identifier associated with each remote control device, for which secondary television receiver, and/or which streaming content, the command is intended.

In some embodiments, input manager 216 receives inputs that do not initially correspond to a predefined command. For example, input manager 216 may receive audio data recorded by remote control device 118. In this example, additional processing may be utilized to determine whether the recorded audio data corresponds to a voice command corresponding to a predefined function of the primary television receiver or some other voice communication requesting information from a remote service, such as a voice assistant or an internet search engine.

In some embodiments, input manager 216 receives a predefined command before receiving recorded audio data from remote control device 118. For example, a user may interact with a button or other input of remote control device 118 prior to issuing a voice command. The user interaction may correspond to a voice command initiation request. Remote control device 118 may capture, record, and/or transmit audio data to input manager 216 in response to receiving the voice command initiation request. In some embodiments, the voice command initiation request is generated by primary television receiver 110 and/or secondary television receiver 112. For example, a user may interact with a user interface (UI) presented by primary television receiver 110 and/or secondary television receiver 112 at a display. Upon interaction with a predefined UI item, such as an icon, a voice command initiation request may be transmitted to remote control device 118 to begin recording and/or transmitting audio data to input manager 216. In some embodiments, the voice command initiation request is transmitted to input manager 216 indicating that audio data is, or soon will be, transmitted to input manager 216. The voice command initiation request may cause remote control device 118 and/or input manager 216 to record and/or process audio data until an indication that the voice command request has been completed.

For example, an additional user interaction with remote control device 118, such as releasing a button, may indicate that the voice command request is complete. As another example, remote control device 118 and/or input manager 216 may detect when the recorded audio data no longer includes audio associated with human voice. In some embodiments, remote control device 118 and/or input manager 216 may determine that the voice command request is complete after detecting the absence of a human voice in the audio data for a predetermined amount of time. For example, remote control device 118 and/or input manager 216 may stop recording and/or processing audio data after one second, two seconds, five seconds, or any other suitable amount of time after detecting that the audio data no longer includes a human voice. In some embodiments, remote control device 118 stops capturing, recording, and/or transmitting audio data in response to a message received from primary television receiver 110 and/or secondary television receiver 112. For example, primary television receiver 110 and/or secondary television receiver 112 may determine that a user has stopped talking. Based on this determination, primary television receiver 110 and/or secondary television receiver 112 may transmit a message to remote control device 118 to stop capturing, recording, and/or transmitting audio data. In some embodiments, voice command server system 103 determines that the user has stopped talking and transmits an indication to primary television receiver 110 and/or secondary television receiver 112 to cause remote control device 118 to stop capturing, recording, and/or transmitting audio data.

In some embodiments, input manager 216 may process the audio data received from remote control device 118 before transmitting it to another process and/or service. For example, input manager 216 may include an audio conversion process configured to convert the audio data into a format suitable for other processes and/or services, such as pulse code modulation (PCM) audio data or adaptive differential pulse-code modulation (ADPCM) audio data.

In some embodiments, input manager 216 provides the audio data to one or more other processes operating on primary television receiver 110. For example, input manager 216 may write the audio data received from remote control device 118 to a storage medium, such as a local memory of primary television receiver 110. In some embodiments, the audio data is written to a circular buffer accessible by the one or more processes operating on primary television receiver 110. Once the audio data is written to the circular buffer, one or more processes may receive an indication that new audio data has been written to the circular buffer and begin to read the audio data from the circular buffer.

Remote data sender 220 may be configured transmit the audio data to secondary television receiver 112. For example, remote data sender 220 may read the audio data from the circular buffer and begin transmitting it to secondary television receiver 112. Remote data sender 220 may utilize communication interface 208, as described above, to transmit the audio data to secondary television receiver 112. For example, remote data sender 220 may provide communication interface 208 with the data and an address, or other unique identifier, for secondary television receiver 112. Communication interface 208 may then transmit the audio data to secondary television receiver 112 using TCP/IP over a wired or wireless connection, as described above.

Secondary television receiver 112 may operate using second operating system 224. Second operating system 224 may include system level software that manages various hardware and software resource of the secondary television receiver 112. For example, second operating system 224 may include one or more drivers configured to display digital content on a television screen communicatively coupled with secondary television receiver 112, such as television 114 as described above. In some embodiments, first operating system 204 and second operating system 224 are different. For example, while first operating system 204 may be a Linux-based operating system that configures primary television receiver 110 to function as a smart TV content receiver, second operating system 224 may be a Linux based operating system that configures secondary television receiver 112 to function as an Android TV content receiver device. As another example, second operating system 224 may be configured to execute a voice assistant process while first operating system 204 may not include one or more resources enabling it to execute a similar voice assistant process.

Second operating system 224 can include one or more processes and/or services such as communication interface 228, television manager 236, control application 240, audio system 256, remote data listener 260, audio HAL 264, and input manager 268. The one or more services of second operating system 224 may configure secondary television receiver 112 to operate as a client type device in relation to primary television receiver 110. For example, secondary television receiver 112 may receive software services, interfaces, and additional processing support from primary television receiver 110 in response to requests from the secondary television receiver 112. Additionally or alternatively, the one or more services of second operating system 224 may configure secondary television receiver 112 to operate without communicating directly to a cloud server or remote service via the Internet. Instead, secondary television receiver 112 may obtain the majority or all of its content directly from primary television receiver 110.

Communication interface 228 may operate in the same, or a similar fashion, as communication interface 208 as described above in reference to primary television receiver 110. For example, communication interface 228 may configure secondary television receiver 112 to transmit and receive data via wireless or wired communication, as described above.

Television manager 236 may be configured to provide services to manage TV sessions associated with primary television receiver 110 and to provide for connection ID management. For example, when a channel change or playback is requested from a user-facing application of secondary television receiver 112, television manager 236 may create a connection to primary television receiver 110 facilitate the request. In some embodiments, television manager 236 handles multiple connections to multiple primary television receivers. For example, secondary television receiver may be configured to receive digital content from any one of a number of primary television receivers to which it is in communication. In this example, television manager 236 may select the appropriate primary television receiver from which to request digital content, initiate a connection with the primary television receiver, and manage the connection until digital content is no longer being transmitted from the primary television receiver to secondary television receiver 112.

Control application 240 may be a system application configured to transmit digital data for display by a television, such as television 114 as described above. Control application 240 may control one or more sub-processes configured to provide a user interface. The one or more sub-processes may include launcher 244, player 248, and/or UI manager 252. UI manager 252 may be configured to facilitate user interface screens include a guide screen, DVR screens, on-demand screens, etc., in some operations, based on queries for content sent to primary television receiver 110. Launcher 244 may be the first application seen when secondary television receiver 112 starts and/or is turned on. Launcher 244 may cause the display of installed applications received from a software repository system and may allow them to be launched. Launcher 244 may display UI web apps, create shelves of content, and display A/V in the background of the launcher. Additionally, or alternatively, launcher 244 may check whether the current mode is a standby mode when secondary television receiver 112 turns on in order to avoid using tuners of primary television receivers when not needed. Player 248 may be configured to facilitate playing of encrypted content obtained from primary television receiver 110, locally issued video track modes (e.g., fast-forward, skip back, etc.), ad insertion, and may handle buffering for streaming content passed-through from primary television receiver 110.

Audio system 256 may include one or more processes and services that configure secondary television receiver 112 to process audio data. For example, audio system 256 may process digital audio data received in connection with digital video content, such as the audio track of a movie, and convert the digital audio data to analog data for transmission to a sound system coupled with secondary television receiver 112. As another example, audio system 256 may receive digital audio data in one format and translate it into another format for additional processing.

In some embodiments, audio system 256 includes a voice command module, such as voice assistant 272. Voice assistant 272 may be configured to receive audio data corresponding to a human voice, translate the audio data into instructions and/or command inputs, and transmit the resulting command inputs to one or more intended processes operating on secondary television receiver 112 for execution of the command. In some embodiments, after receiving the audio data, voice assistant 272 converts the audio data into voice command data. For example, the audio data may be converted from one digital audio format to a voice command format. As another example, voice assistant 272 may encapsulate the audio data within other data structures including additional information related to the operating system environment or source device ID. In some embodiments, voice assistant 272 transmits the voice command data to a remote server for translation into the command inputs. For example, after converting the audio data into voice command data, voice assistant 272 may transmit the voice command data to voice command server system 103.

In some embodiments, the voice command data may be transmitted to voice command server system 103 via primary television receiver 110. For example, while primary television receiver 110 may be in communication with voice command server system 103 via network 120, secondary television receiver 112 may only be communication with primary television receiver 110 via a local network, such as local network 121 as described above. In this example, voice assistant 272 may first transmit the voice command data to primary television receiver 110 using communication interface 228. After receiving the voice command data, primary television receiver 110 may determine that the voice command data is addressed to voice command server system 103 and proceed to transmit the voice command data to voice command server system 103 via network 120 using communication interface 208.

After receiving the audio data, voice command server system 103 may proceed to translate the audio data into text and interpret the resulting text to determine the intended action requested by the speech. In some embodiments, voice command server system 103 may determine that the speech corresponds to a request for one or more actions or functions provided by primary television receiver 110 and/or secondary television receiver 112. For example, the speech may correspond to a request to change television channels or to open a different media application. In this example, voice command server system 103 may respond with an indication of the interpreted command or action requested. In some embodiments, voice command server system 103 may determine that the speech corresponds to a request for information. For example, the speech may correspond to a request for the local weather forecast. In this example, voice command server system 103 may respond with the requested information.

In some embodiments, a command input is received from voice command server system 103 in response to transmitting the voice command data to voice command server system 103. The command input may include a command configured to control one or more functions of primary television receiver 110 and/or secondary television receiver 112. In some embodiments, the command input generated by voice command server system 103 is received by primary television receiver 110 and transmitted to secondary television receiver 112 for additional processing by voice assistant 272. For example, as described above, secondary television receiver 112 may be in communication with other devices on a local network without being directly connected to network 120.

In some embodiments, voice assistant 272 receives the command input from voice command server system 103 via primary television receiver 110 and determines that the command input includes a request for an action from control application 240. For example, the command input may include a request for control application 240 to pause currently playing digital content. As another example, the command input may include a request for control application 240 to change from a currently displayed television channel to another available television channel. Control application 240 and/or television manager 236 may then generate a tuning request based on the command input. The tuning request may include a request for a television frequency tuner of primary television receiver 110 to tune to a particular television channel. Television manager 236 may then transmit the tuning request to primary television receiver 110 via communication interface 228. In response to receiving the tuning request from secondary television receiver 112, primary television receiver 110 my tune a television frequency tuner to a television channel frequency associated with the television channel from a plurality of television channel frequencies. Primary television receiver 110 may then transmit a video stream to secondary television receiver.

Audio HAL 264 may include one or more processes configured to provide communication between audio system 256 and other processes operating on secondary television receiver 112. Additionally, or alternatively, audio HAL 264 may include an implementation of a hardware abstraction layer (HAL) interface for audio system 256. For example, audio HAL 264 may connect to audio system 256 using the HAL interface and initiate one or more processes on audio data received by audio HAL 264. In some embodiments, audio HAL 264 provides socket connections to receive audio data from other processes executing on secondary television receiver 112.

Input manager 268 may operate in the same or a similar fashion as input manager 216, as described above in reference to primary television receiver 110. For example, input manager 268 may be configured to receive inputs, such as commands, or recorded audio data, from remote control device 118. In some embodiments, after receiving audio data from remote control device 118, input manager 268 may transmit the audio data to voice assistant 272 via audio HAL 264. For example, input manager 268 may write the audio data to audio HAL 264 via a socket connection.

In some embodiments, secondary television receiver 112 may not include input manager 268. For example, secondary television receiver may not be configured to receive commands and/or inputs from remote control device 118. In this case, audio data received by input manager 216, and transmitted by remote data sender 220, may be received by remote data listener 260. Remote data listener 260 may include one or more processes configured to receive incoming data transmissions including audio data. Remote data listener 260 may then transmit the audio data received from remote data sender 220 to audio HAL 264 for processing by voice assistant 272.

Figure 3:
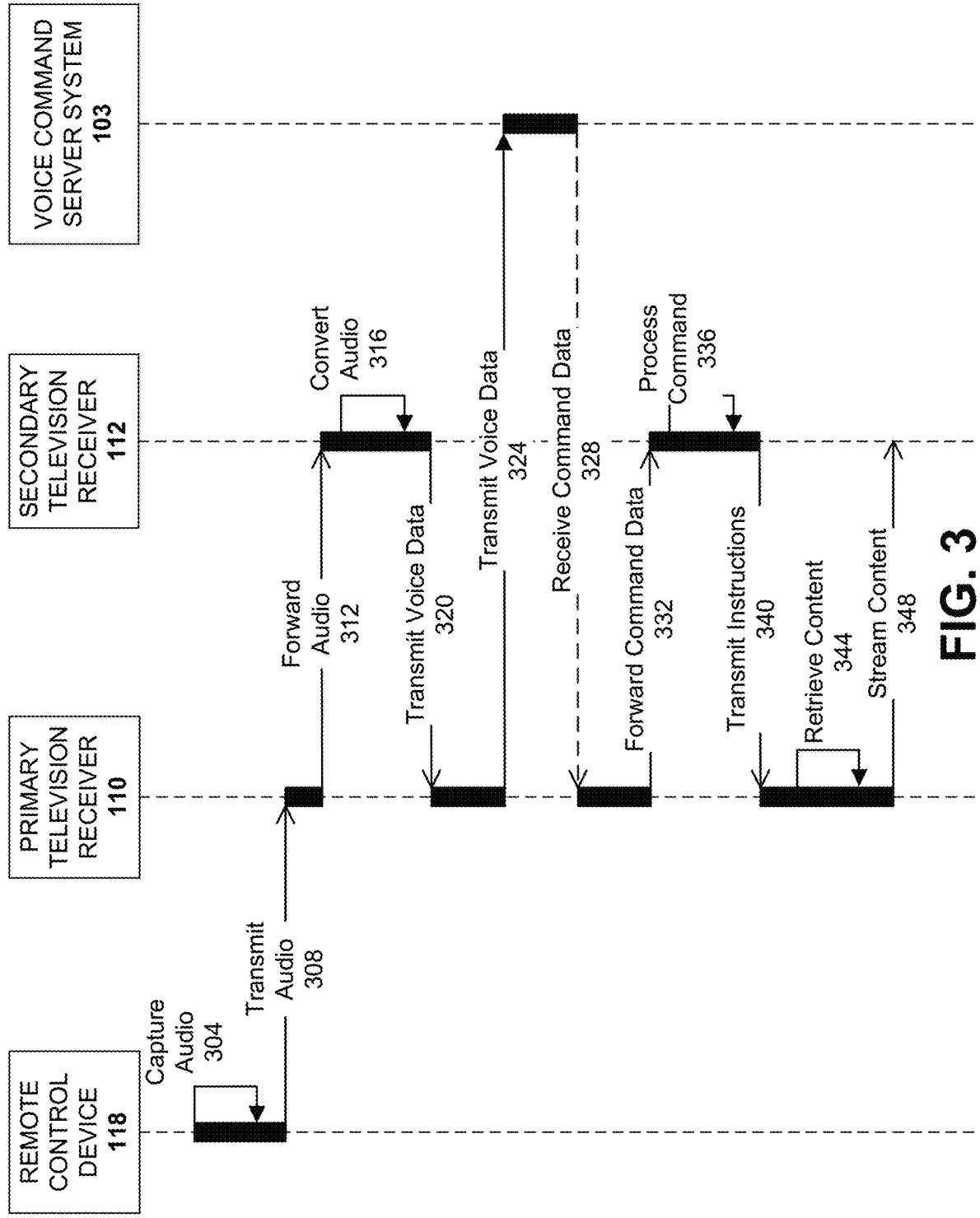
FIG. 3 illustrates a sequence diagram of communication in a smart television receiver system for voice command integrated smart television receivers connected over a local network according to some embodiments.

FIG. 3 illustrates a sequence diagram of communication in a smart television receiver system for voice command integrated smart television receivers connected over a local network. In some embodiments, a smart television receiver system includes remote control device 118, primary television receiver 110, secondary television receiver 112, and voice command server system 103.

As described above, primary television receiver 110 and secondary television receiver 112 may be communicatively coupled within a local area network, such as local network 121. The local area network may be separate from the Internet. For example, requests for Internet data generated by devices within the local area network may be transmitted to the Internet via a device acting as a routing device that is both connected to the local area network and the Internet. Primary television receiver 110 and voice command server system 103 may be communicatively coupled within a wide area network, such as network 120, as described above. For example, primary television receiver 110 may act as a routing device coupled with the Internet and be configured to route data from other devices in the local area network to services provided over the Internet. Remote control device 118 may be communicatively coupled with primary television receiver 110 and/or secondary television receiver 112, as described above. For example, remote control device 118 may transmit and receive data from primary television receiver 110 and/or secondary television receiver 112 via wireless communications.

In some embodiments, one or more services provided by secondary television receiver 112 utilize data and services accessible via the Internet. For example, a voice assistant process, such as voice assistant 272 as described above, may utilize data and services provided over the Internet by voice command server system 103. The data and services may include converting voice command data received by remote control device 118 into commands that can control one or more functions of primary television receiver 110 and/or secondary television receiver 112. In some embodiments, the one or more services provided by secondary television receiver 112, such as the voice assistant, may not be compatible with the operating system executing on primary television receiver 110.

In some embodiments, the sequence of communications illustrated in FIG. 3 are representative of the steps performed by the various devices in a smart television receiver system to enable the functionalities of a voice assistant. At step 304, remote control device 118 captures audio data. The audio data may comprise a human voice. For example, an operator of remote control device 118 may speak into a microphone coupled with remote control device. In some embodiments, the audio data is captured in response to a voice command initiation request. For example, remote control device 118 may include a voice command initiation request button which activates an audio data recording process in response to operator interaction with the button. As another example, remote control device 118 may be configured to interpret audio corresponding to a predefined voice command initiation request phrase and begin capturing audio data upon detecting that an operator has spoken the predefined phrase into remote control device 118.

At step 308, remote control device 118 transmits the audio data to primary television receiver 110. Remote control device 118 may transmit the audio data to primary television receiver 110 using one or more means of wireless communication, such as ZigBee® RF4CE and/or Bluetooth®. The audio data may be transmitted to primary television receiver 110 in one or more formats, such as a pulse code modulated (PCM) audio data format. In some embodiments, remote control device 118 may transmit the voice command initiation request, or an indication of the voice command initiation request, to primary television receiver 110 prior to transmitting the audio data. For example, the voice command initiation request may cause primary television receiver 110 to begin processing the audio data received from remote control device 118. Remote control device 118 may begin transmitting the audio data to primary television receiver as it is received from the operator. In some embodiments, remote control device 118 may also transmit the audio data after all of the audio data has been captured. For example, remote control device 118 may transmit the audio data after receiving an indication that the operator is done speaking. The indication may include receiving an interaction with a button or other input of remote control device 118. Additionally, or alternatively, the indication may correspond with a predefined amount of time in which remote control device 118 no longer detects human speech.

In some embodiments, an input manager, such as input manager 216 as described above, processes the audio data received from remote control device 118 by storing it at a location in memory accessible by other processes operating on primary television receiver 110. For example, the input manager may store the audio data in a buffer, such as a circular or ring buffer. One or more other processes operating on primary television receiver 110 may monitor the status of the buffer and detect that new audio data has been written to the buffer. Upon detecting that new audio data has been written, the one or more other processes may then read the audio data from the buffer for additional processing.

At step 312, primary television receiver 110 forwards the audio data to secondary television receiver 112. Primary television receiver 110 may forward the audio data to secondary television receiver 112 for processing by one or more services that are only compatible with secondary television receiver 112. In some embodiments, primary television receiver 110 transmits the audio data to secondary television receiver 112 via a local area network connection, such as local network 121 as described above. For example, primary television receiver 110 may use TCP/IP to transmit the audio data to secondary television receiver 112. The audio data may be transmitted via wired connection, such as via a USB cable or a coaxial cable. Alternatively, or additionally, primary television receiver may transmit the audio data using a wireless connection, such as Wi-Fi.

At step 316, secondary television receiver 112 converts the audio data into voice command data. In some embodiments, the audio data received by secondary television receiver 112 is provided to an audio system, such as audio system 256 as described above, for processing and conversion into voice command data. The audio data may be provided to the audio system via an audio hardware abstraction layer (HAL) interface. The audio HAL interface may enable one or more processes to pass the audio data to a voice assistant as input and receive one or more commands actionable by the one or more processes in response, as further described below.

In some embodiments, the audio system and/or a voice assistant converts the audio data into voice command data. The voice command data may include the same and/or a converted version of the audio data, as well as additional data configured to help voice command server system 103 to process the voice command data and generate an accurate command corresponding to the spoken commands provided by an operator of remote control device 118. The additional data may include identifying information related to secondary television receiver 112, such as a unique identifier, and/or information related to the available functionalities and capabilities provided by secondary television receiver 112.

At step 320, secondary television receiver 112 transmits the voice command data to primary television receiver 110. The audio system and/or the voice assistant may use the same means of communication used to receive the audio data in order to transmit the voice command data to primary television receiver 110. For example, the voice command data may be transmitted using TCP/IP over a wired or wireless connection between secondary television receiver 112 and primary television receiver 110.

At step 324, primary television receiver 110 transmits the voice command data to voice command server system 103. Primary television receiver 110 may transmit the voice command data via a wide area network, such as the Internet. After receiving the voice command data, voice command server system 103 may translate the audio data into textual data corresponding to the language spoken by the operator of remote control device 118. Voice command server system 103 may then interpret the textual data to determine the one or more commands intended by the operator of remote control device 118. For example, the textual data may be interpreted as a request for primary television receiver 110 and/or secondary television receiver 112 to perform one or more actions such as changing a channel or opening a particular software application. As another example, the textual data may be interpreted as a request for real world information accessible by voice command server system 103 such as a weather forecast. In some embodiments, after translating and/or interpreting the voice command data, voice command server system 103 generates a command corresponding to the speech provided by the operator of remote control device 118. For example, the command may include instructions to change to a specific channel or execute a particular software application.

At step 328, primary television receiver 110 receives a command from voice command server system 103. Primary television receiver 110 may determine that the command is in response to voice command data transmitted by primary television receiver 110 to voice command server system 103 on behalf of secondary television receiver 112. In some embodiments, the command includes an indication to which of multiple secondary television receivers the command is intended. Based on the indication, primary television receiver 110 may determine to which of multiple possible secondary television receivers the command will be forwarded.

At step 332, primary television receiver 110 forwards the command to secondary television receiver 112. In some embodiments, primary television receiver 110 receives the command and determines that the command was generated in response to voice command data transmitted by secondary television receiver 112. For example, the command may be received with additional identifying information specifying a unique identifier for the requesting process and/or device. Primary television receiver 110 may then determine that the unique identifier corresponds to secondary television receiver 112 and transmit the command to secondary television receiver 112. The command may be transmitted using any of the communication means discussed above such as via a wireless or wired connection between primary television receiver 110 and secondary television receiver 112.

At step 336, secondary television receiver 112 processes the command. In some embodiments, a voice assistant, such as voice assistant 272 as described above, processes the command. For example, after receiving the command, a communication interface of secondary television receiver 112 may determine that the incoming command was received from voice command server system 103 and should be processed by the voice assistant process. In some embodiments, processing the command comprises controlling an operation of secondary television receiver 112 based on the command. For example, the voice assistant process may interpret the command and transmit instructions to one or more processes executing on secondary television receiver 112 for additional action by a hardware and/or software component of secondary television receiver 112. For example, the command may cause another process executing on secondary television receiver 112 to execute a new software application for display by a television screen communicatively coupled with secondary television receiver 112.

In some embodiments, instructions corresponding to the command are transmitted to a control application, such as control application 240 as described above, executing on secondary television receiver 112. The control application may interpret the instructions as a request to present specific digital content at a television screen communicatively coupled with secondary television receiver 112. For example, the command and/or instructions may correspond to a request to change from one content channel provided by primary television receiver 110 to another content channel provided by primary television receiver 110. As another example, the command may correspond to a request to stream digital content stored in a memory of primary television receiver 110 to secondary television receiver 112.

In some embodiments, the command causes one or more processes operating on secondary television receiver 112 to generate instructions for execution by primary television receiver 110. For example, the command may correspond to a request for primary television receiver 110 to provide one or more services, such as media streaming services, to secondary television receiver 112. Additionally, or alternatively, the command may correspond with a request for primary television receiver 110 to provide one or more services to a display communicatively coupled with primary television receiver 110. In some embodiments, the control application generates a content request based on the command. Continuing with the example command described above including a request to change from one content channel to another content channel, the control application may cause a television manager process, such as television manager 236 as described above, to generate a tuning request. The tuning request may include a request for primary television receiver 110 to tune a television frequency tuner to a specific television channel.

At step 340, secondary television receiver 112 transmits instructions to primary television receiver 110 to provide one or more services to secondary television receiver. After receiving the instructions, primary television receiver 110 may identify one or more processes executing on primary television receiver 110 to execute the instructions. For example, primary television receiver 110 may identify a television frequency tuner configured to tune to one of a plurality of frequencies corresponding to a plurality of television channels to execute instructions associated with a tuning request. As another example, primary television receiver 110 may identify a digital content library configured to stream digital content stored in primary television receiver 110 to execute instructions associated with a content streaming request. While the above examples refer to providing digital content, other instructions may configure primary television receiver to provide other services to secondary television receiver 112, such as providing additional software applications and/or updates for installation by secondary television receiver 112.

At step 344, after determining that the instructions correspond with a request to provide digital content to secondary television receiver 112, primary television receiver 110 retrieves the requested content. In some embodiments, retrieving the content includes tuning a television frequency tuner. For example, in response to a tuning request, primary television receiver 110 may cause a television frequency tuner to tune to a frequency associated with the requested television channel. In some embodiments, retrieving the content includes accessing digital content stored in a memory of primary television receiver 110. For example, in response to a content streaming request, primary television receiver 110 may query a database stored on a hard drive coupled with primary television receiver 110 for the requested digital content.

At step 348, after retrieving the digital content, primary television receiver 110 streams the content to secondary television receiver 112. In some embodiments, the digital content may include a live stream of digital data. For example, the digital content may include a video stream received by a television frequency tuner coupled with a satellite antenna at the frequency associated with a specific television channel. Upon receiving the digital content, secondary television receiver 112 may process the digital data for display at a television screen communicatively coupled with secondary television receiver. In some embodiments, primary television receiver 112 streams the content directly to a display, such as a television coupled with primary television 110.

Figure 4:
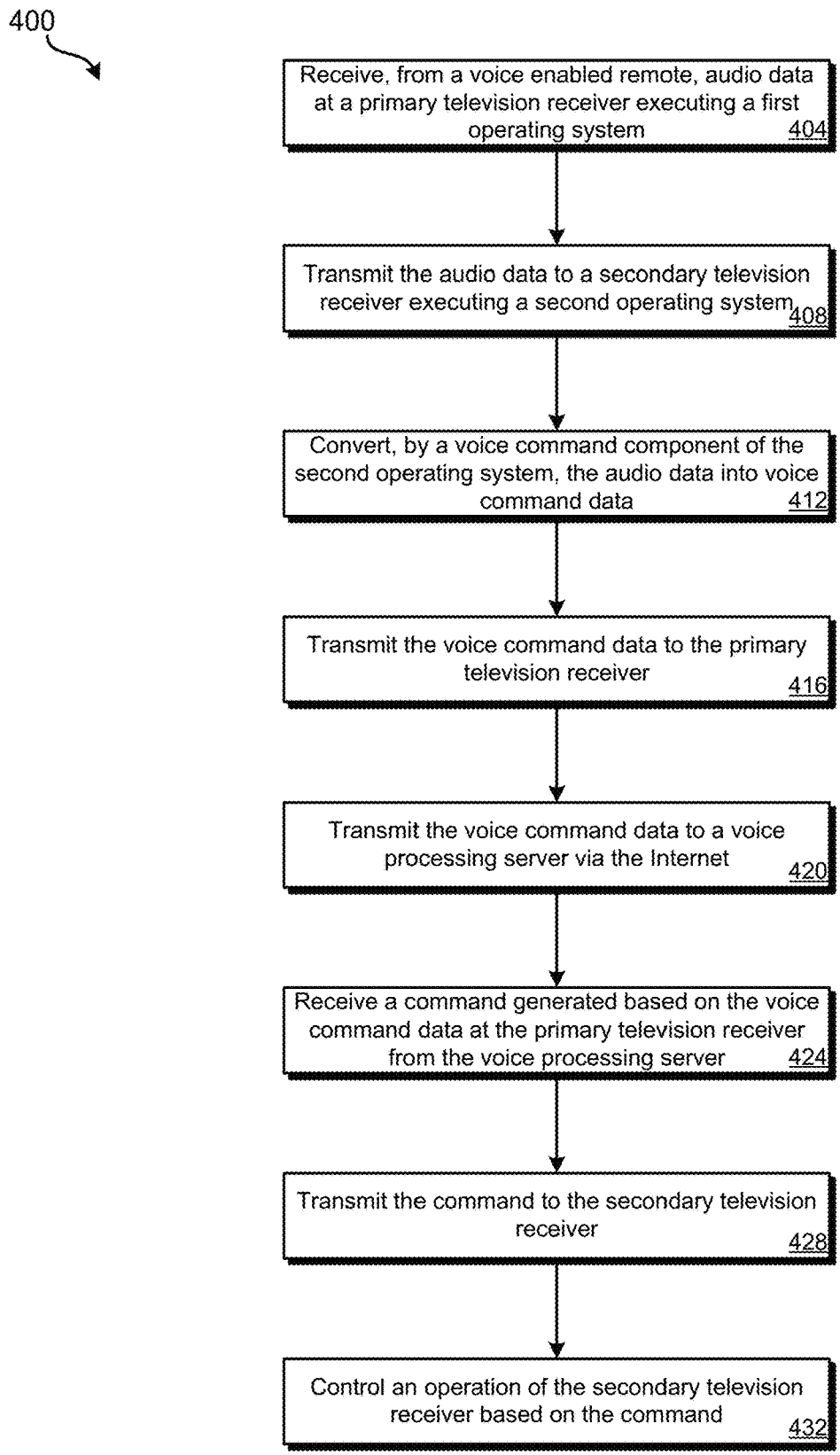
FIG. 4 illustrates an embodiment of a method for facilitating smart television content in a smart television receiver system for voice command integrated smart television receivers connected over a local network.

Various methods may be performed using the systems detailed in FIGS. 1-3 to facilitate the retrieval and presentation of smart television content. FIG. 4 illustrates an embodiment of a method 400 for facilitating smart television content in a smart television receiver system for voice command integrated smart television receivers connected over a local network. In some embodiments, method 400 may be performed by one or more components of smart television content system 100, such as primary television receiver 110 and/or secondary television receiver 112 as described above. For example, the one or more components of first operating system 204 may perform steps related to primary television receiver 110 while the one or more components of operating system 224 may perform steps related to secondary television receiver 112.

Method 400 may include, at block 404, receiving audio data from a voice enabled remote at a primary television receiver executing a first operating system. The voice enabled remote control may be the same, or function in a similar manner as, remote control device 118 described above. In some embodiments, the primary television receiver may be the same, or function in a similar manner as primary television receiver 110 as described above. For example, the first operating system may be the same, or function in a similar manner as, first operating system 204 described above.

In some embodiments, the audio data is captured by the voice enabled remote control. For example, an operator of the voice enabled remote control may speak into a microphone coupled with the voice enabled remote control. In other words, the audio data may include human speech. In some embodiments, the voice enabled remote control receives a voice command initiation request and the audio data is captured in response. For example, the voice enabled remote control may include a voice command initiation request button which activates an audio data recording process in response to operator interaction with the button. As another example, the voice enabled remote control may be configured to interpret audio corresponding to a pre-defined voice command initiation request phrase and begin capturing audio data upon detecting that an operator has spoken the predefined phrase into the voice enabled remote control.

After capturing the audio data, the voice enabled remote control may then transmit the audio data to the primary television receiver. The audio data may be transmitted by the voice enabled remote control and received by the primary television receiver using one or more means of wireless communication, such as ZigBee® RF4CE and/or Bluetooth® communications. The audio data may be transmitted to the primary television receiver in one or more formats, such as a pulse code modulated (PCM) audio data format.

In some embodiments, the voice enabled remote control transmits the voice command initiation request, or an indication of the voice command initiation request, to the primary television receiver. For example, the voice enabled remote control may cause the primary television receiver to begin receiving and/or processing the captured audio data by transmitting the voice command initiation request to the primary television receiver.

At block 408, the audio data is transmitted to a secondary television receiver. The secondary television receiver may be the same, or function in a similar manner as, secondary television receiver 112 as described above. The secondary television receiver executes a second operating system. The second operating system may be the same, or function in a similar manner as operating system 224 as described above. In some embodiments, the second operating system is different from the first operating system. For example, the first operating system may configure the primary television receiver to provide one or more server type resources and/or services to one or more secondary television receivers while the second operating system may configure the secondary television receiver to provide one or more client type resources and/or services to a user interacting with the secondary television receiver.

In some embodiments, the primary television receiver is connected to the secondary television receiver within a local area network separate from the Internet. For example, the primary television receiver and/or the secondary television receiver may be assigned link local addresses as part of a local network, such as local network 121 as described above. In some embodiments, the primary television receiver and the secondary television receiver are coupled via a wired connection. For example, the primary television receiver and the secondary television receiver may by communicatively coupled using a universal serial bus. As another example, the primary television receiver and the secondary television receiver may be communicatively coupled using a coaxial cable. In some embodiments, the primary television receiver and the secondary television receiver are communicatively coupled using a wireless network. For example, the primary television receiver and the secondary television receiver may include one or more Wi-Fi antennas. The primary television receiver may use TCP/IP to transmit the audio data to the secondary television receiver using a wired and/or wireless connection.

In some embodiments, the voice enabled remote control transmits the voice command initiation request, or an indication of the voice command initiation request, to the secondary television receiver. The voice command initiation request may be transmitted to the secondary television receiver via the primary television receiver. For example, after receiving the voice command initiation request, the primary television receiver may first transmit the voice command initiation request to the secondary television receiver before processing the audio data from the voice enabled remote control.

At block 412, a voice command component of the second operating system converts the audio data into voice command data. In some embodiments, the second operating system comprises a voice command component that is executed locally. The voice command component may be the same, or function in a similar manner as, voice assistant 272 as described above. For example, the voice command component may be configured to receive audio data and generate instructions to control one or more functions of the secondary television receiver.

In some embodiments, an audio data listener is initiated by the voice command component. For example, after receiving a voice command initiation request, the voice command component and/or another component executing on the secondary television receiver, may begin reading audio data from a shared memory configured to receive the audio data from the primary television receiver. As the audio data is read from the shared memory, one or more processes may provide the audio data to the voice command component using an audio hardware abstraction layer (HAL) interface. The audio HAL interface may enable one or more processes executing on the secondary television receiver to provide the audio data as an input and receive instructions as an output.

In some embodiments, the secondary television receiver converts the audio data format before the audio data is converted into voice command data. For example, after receiving the audio data in a first format, the secondary television receiver may convert the audio data in the first format to a second format. After converting the audio data into the second format, the secondary television receiver may then transmit the audio data in the second format to the voice command component. The voice command data may include the same and/or a converted version of the audio data as well as additional data configured to help a voice command server system process the voice command data and generate an accurate command corresponding to the spoken commands provided by an operator of the voice enabled remote control. The additional data may include identifying information related to the secondary television receiver, such as a unique identifier and/or information related to the available functionalities and capabilities provided by the secondary television receiver.

The voice command component may be a sub-component of an overall audio system provided by the second operating system. For example, the second operating system may include an audio system, such as audio system 256 as described above. The audio system may include a combination of hardware and/or software components configured to receive analog and/or digital audio, process the audio, and output digital and/or analog data. The audio system may also use the voice command component to generate instructions that control one or more functions of the secondary television receiver based on the audio data, as described below.

At block 416, the voice command data is transmitted to the primary television receiver. As described above, the primary television receiver may be communicatively coupled to the Internet. The primary television receiver and the secondary television receiver may be connected within a local area network separate from the Internet. In other words, the secondary television receiver may be connected to the Internet via only the primary television receiver. Further, the voice command component may utilize one or more services provided by a server system external to the local area network and/or accessible over the Internet to translate and interpret the voice command data. Accordingly, the voice command component, and/or the secondary television receiver, may utilize the primary television receiver as a router to transmit data to, and receive data from, the Internet.

At block 420, the voice command data is transmitted to a voice processing server. In response to receiving the voice command data, the primary television receiver may determine that the voice command data is addressed to a service and/or system external to the local area network. The primary television receiver may then transmit the voice command data to the external service and/or system via the Internet. The voice processing server may be a commercial service designed to receive voice command data from multiple voice command components and return commands and/or information to the respective voice command components.

At block 424, a command generated based on the voice command data is received at the primary television receiver from the voice processing server. In some embodiments, after receiving the voice command data, the voice processing server may translate the audio data into textual data corresponding to the language spoken by the operator of the voice enabled remote. The voice processing server may then interpret the textual data to identify one or more commands intended by the operator of the voice enabled remote. For example, the textual data may be interpreted as a request for the primary television receiver and/or the secondary television receiver to perform one or more actions such as changing a channel or opening a particular software application. As another example, the textual data may be interpreted as a request for real world information accessible by the voice processing server via the internet. In some embodiments, after translating and/or interpreting the voice command data, the voice processing server generates a command corresponding to the speech provided by the operator of the voice enabled remote. In other words, the command is generated based on the voice command data received by the voice processing server. For example, the command may include instructions to change to a specific channel or execute a particular software application.

At block 428, the command is transmitted to the secondary television receiver. In some embodiments, the voice command component utilizes specific libraries and/or functions to interpret the command generated by the voice processing server. Further, the specific libraries, functions, and/or the voice command component itself, may only be executed on predefined operating systems. For example, the voice command component may be executable by the second operating system of the secondary television receiver while the first operating system of the primary television receiver may not be configured to execute the voice command component. Accordingly, after receiving the command from the voice processing server, the primary television receiver may transmit the command to the secondary television receiver for additional processing by the voice command component.

At block 432, an operation of the secondary television receiver is controlled based on the command. In some embodiments, after receiving the command, the voice command component will interpret the command and generate instructions to control one or more operations of the secondary television receiver. For example, the voice command component may interpret the command and generate instructions specific to the second operating system and/or the available hardware coupled with the secondary television receiver. Alternatively, or additionally, the voice command component may interpret the command and call one or more methods defined by the audio HAL interface. The methods defined by the audio HAL interface may be implemented to control various specific software applications executing on the second operating system of the secondary television receiver. Further, various implementations of the audio HAL interface may interact with a control application, such as control application 240 as described above. For example, the voice command component may interpret a command as a request for the secondary television receiver to launch a specific software application. The voice command component may call a method defined by the audio HAL interface designed to launch software applications. The control application may be configured to implement the method and, when the method is called, the control application will launch the requested software application. As another example, the voice command component may interpret a command as a request to change the display of a digital content presented by a television screen communicatively coupled with the secondary television receiver.

In some embodiments, the commands received by the voice command component cause the secondary television receiver to control one or more operations of the primary television receiver. For example, the voice command component may interpret a command as a request to change from one digital content channel to another digital content channel. The voice command component may then transfer the request to the control application of the secondary television receiver to change the digital content. After receiving the request, the control application may determine that a new request for the digital content channel must be generated and transmitted to the primary television receiver in order for the primary television receiver to begin streaming the new digital content channel to the secondary television receiver.

Figure 5:
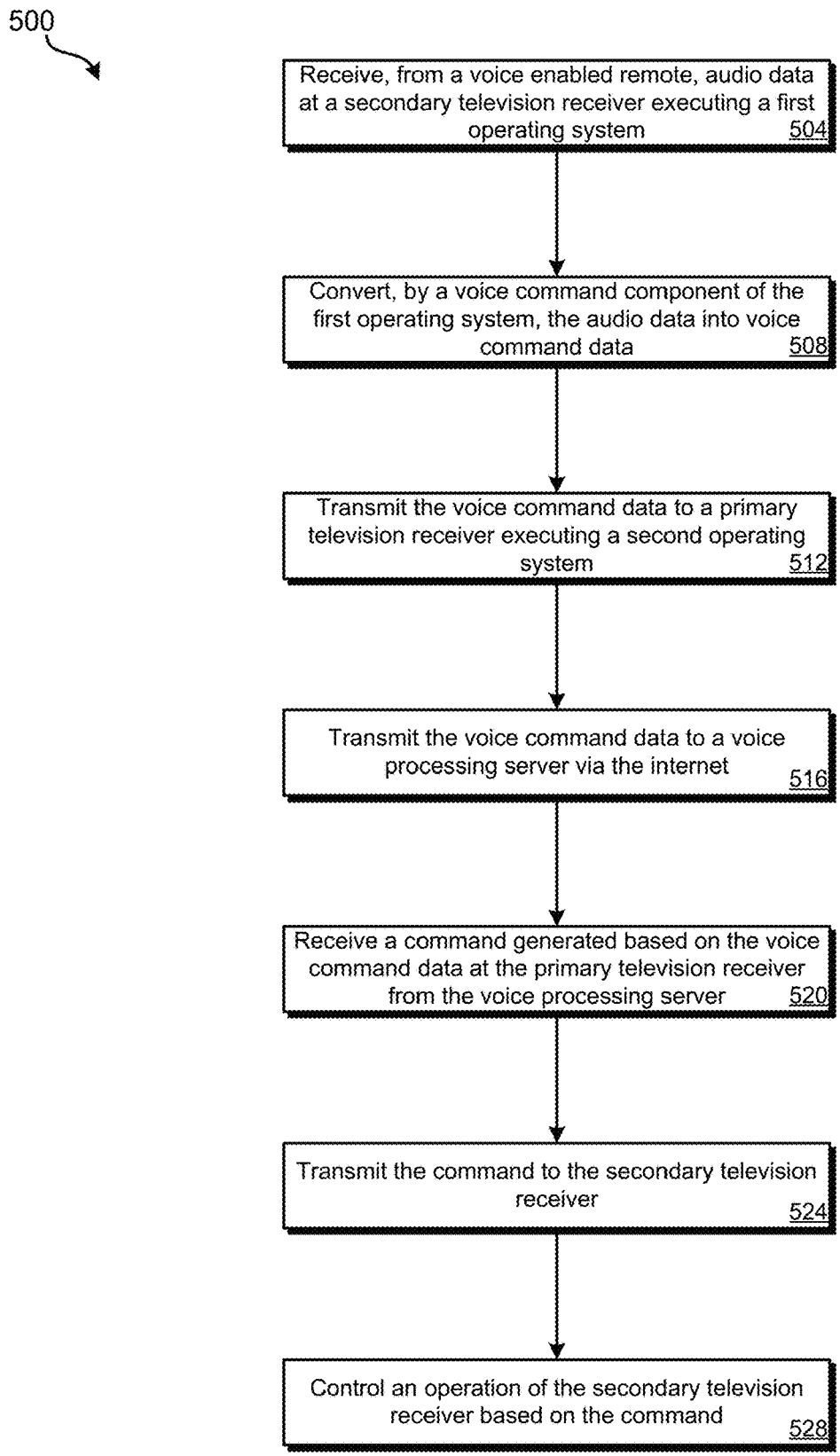
FIG. 5 illustrates another embodiment of a method for facilitating smart television content in a smart television receiver system for voice command integrated smart television receivers connected over a local network.

In some embodiments, the primary television receiver includes a television frequency tuner configured to tune to one of a plurality of frequencies corresponding to a plurality of television channels. For example, the primary television receiver may be communicatively coupled with a satellite antenna configured to receive the plurality of frequencies from a service provider, such as service provider 102 as described above. In this example, a request to change a digital content channel may be interpreted by the control application of the secondary television receiver as a request to tune a television frequency tuner to a television channel. The control application may then cause a television manager component, such as television manager 236 as described above, to generate a tuning request including a request for the television frequency tuner of the primary television receiver to tune to the requested television channel. After generating the request, the control application and/or the television manager component may then transmit the tuning request from the secondary television receiver to the primary television receiver. In response to receiving the request, a television frequency tuner of the primary television receiver may then be tuned to a frequency associated with the television channel. Once the television frequency tuner is done tuning, the primary television receiver may transmit a video stream received by the television frequency tuner at the frequency associated with the television channel to the secondary television receiver for display by a television screen communicatively coupled with the secondary television receiver. The video stream may be received by the primary television receiver from the satellite antenna via a satellite link with the service provider FIG. 5 illustrates another embodiment of a method 500 for facilitating smart television content in a smart television receiver system for voice command integrated smart television receivers connected over a local network. Method 500 may be performed by one or more components of smart television content system 100, such as primary television receiver 110 and/or secondary television receiver 112 as described above. Method 500 may include, at block 504, receiving audio data from a voice enabled remote at a secondary television receiver executing a first operating system. The secondary television receiver may be the same, or function in a similar manner as, secondary television receiver 112 as described above. The secondary television receiver executes a first operating system. The first operating system may be the same, or function in a similar manner as operating system 224 as described above. The voice enabled remote control may be the same, or function in a similar manner as, remote control device 118 described above.

In some embodiments, the secondary television receiver may not be configured to receive audio data directly from the voice enabled remote control. For example, as illustrated and described in relation to FIG. 4, the secondary television receiver may receive audio data captured by a voice enabled remote via a primary television receiver. In some embodiments, the secondary television receiver includes one or more components configured to receive and process audio data from the voice enabled remote. For example, the secondary television receiver may include an input manager component, such as input manager 268 as described above. The input manager may configure the secondary television receiver to receive audio data from the voice enabled remote. For example, the input manager may configure the secondary television receiver to receive wireless communications using a ZigBee® RF4CE and/or a Bluetooth® connection from the voice enabled remote.

In some embodiments, the audio data may first be captured by the voice enabled remote control. For example, an operator of the voice enabled remote control may speak into a microphone coupled with the voice enabled remote control. In some embodiments, the voice enabled remote control receives a voice command initiation request and the audio data is captured in response. For example, the voice enabled remote control may include a voice command initiation request button which activates an audio data recording process in response to operator interaction with the button. As another example, the voice enabled remote control may be configured to interpret audio corresponding to a predefined voice command initiation request phrase and begin capturing audio data upon detecting that an operator has spoken the predefined phrase into the voice enabled remote control.

At block 508, a voice command component of the second operating system converts the audio data into voice command data. In some embodiments, the first operating system comprises a voice command component that is executed locally by the secondary television receiver. The voice command component may be the same, or function in a similar manner as, voice assistant 272 as described above. For example, the voice command component may be configured to receive audio data and generate instructions to control one or more functions of the secondary television receiver.

In some embodiments, an audio data listener is initiated by the voice command component. For example, after receiving a voice command initiation request, the voice command component and/or another component executing on the secondary television receiver, may begin reading audio data from a shared memory configured to receive the audio data from the voice enabled remote. As the audio data is read from the shared memory, one or more processes may provide the audio data to the voice command component using an audio hardware abstraction layer (HAL) interface. The audio HAL interface may enable one or more processes executing on the secondary television receiver to provide the audio data as an input and receive instructions as an output.

In some embodiments, the secondary television receiver converts the audio data format before the audio data is converted into voice command data. For example, after receiving the audio data in a first format, the secondary television receiver may convert the audio data in the first format to a second format. After converting the audio data into the second format, the secondary television receiver may then transmit the audio data in the second format to the voice command component. The voice command data may include the same and/or a converted version of the audio data as well as additional data configured to help a voice command server system process the voice command data and generate an accurate command corresponding to the spoken commands provided by an operator of the voice enabled remote. The additional data may include identifying information related to the secondary television receiver, such as a unique identifier and/or information related to the available functionalities and capabilities provided by the secondary television receiver.

The voice command component may be a sub-component of an overall audio system provided by the first operating system. For example, the first operating system may include an audio system, such as audio system 256 as described above. The audio system may include a combination of hardware and/or software components configured to receive analog and/or digital audio, process the audio, and output digital and/or analog data. The audio system may also use the voice command component to generate instructions that control one or more functions of the secondary television receiver based on the audio data, as described below.

At block 512, the voice command data is transmitted to the primary television receiver. The primary television receiver may be the same, or function in a similar manner as, primary television receiver 110 as described above. The second operating system may be the same, or function in a similar manner as, first operating system 204 described above. The primary television receiver may be communicatively coupled to the Internet. The primary television receiver and the secondary television receiver may be connected within a local area network separate from the Internet. In other words, the secondary television receiver may be connected to the Internet via only the primary television receiver. Further, the voice command component may utilize one or more services provided by a server system external to the local area network and/or accessible over the Internet to translate and interpret the voice command data. Accordingly, the voice command component, and/or the secondary television receiver, may utilize the primary television receiver as a router to transmit data to, and receive data from, the Internet.

At block 516, the voice command data is transmitted to a voice processing server. In response to receiving the voice command data, the primary television receiver may determine that the voice command data is addressed to a service and/or system external to the local area network. The primary television receiver may then transmit the voice command data to the external service and/or system via the Internet. The voice processing server may be a commercial service designed to receive voice command data from multiple voice command components across the network and return commands and/or information to the respective voice command components.

At block 520, a command generated based on the voice command data is received at the primary television receiver from the voice processing server. In some embodiments, after receiving the voice command data, the voice processing server may translate the audio data into textual data corresponding to the language spoken by the operator of the voice enabled remote. The voice processing server may then interpret the textual data to identify one or more commands intended by the operator of the voice enabled remote. For example, the textual data may be interpreted as a request for the primary television receiver and/or the secondary television receiver to perform one or more actions such as changing a channel or opening a particular software application. As another example, the textual data may be interpreted as a request for real world information accessible by the voice processing server via the internet. In some embodiments, after translating and/or interpreting the voice command data, the voice processing server generates a command corresponding to the speech provided by the operator of voice enabled remote. In other words, the command is generated based on the voice command data received by the voice processing server. For example, the command may include instructions to change to a specific channel or execute a particular software application.

At block 524, the command is transmitted to the secondary television receiver. In some embodiments, the voice command component utilizes specific libraries and functions to interpret the command generated by the voice processing server. Further, the specific libraries and functions, and/or the voice command component itself, may only be executed on predefined operating systems. For example, the voice command component may be executable by the first operating system of the secondary television receiver while the second operating system of the primary television receiver may not be configured to execute the voice command component. Accordingly, after receiving the command from the voice processing server, the primary television receiver may transmit the command to the secondary television receiver for additional processing by the voice command component.

At block 528, an operation of the secondary television receiver is controlled based on the command. In some embodiments, after receiving the command, the voice command component will interpret the command and generate instructions to control one or more operations of the secondary television receiver. For example, the voice command component may interpret the command and generate instructions specific to the second operating system and/or the available hardware coupled with the secondary television receiver. Alternatively, or additionally, the voice command component may interpret the command and call one or more methods defined by the audio HAL interface. The methods defined by the audio HAL interface may be implemented to control various specific software applications executing on the first operating system of the secondary television receiver. Further, various implementations of the audio HAL interface may interact with a control application, such as control application 240 as described above. For example, the voice command component may interpret a command as a request for the secondary television receiver to launch a specific software application. The voice command component may call a method defined by the audio HAL interface designed to launch software applications. The control application may be configured to implement the method and, when the method is called, the control application will launch the requested software application. As another example, the voice command component may interpret a command as a request to change the display of a digital content presented by a television screen communicatively coupled with the secondary television receiver.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for facilitating smart television content receivers in a local network, comprising:
   receiving, at a primary television receiver, audio data from a voice enabled remote control, wherein:
      the audio data comprises human voice; and
      the primary television receiver executes a first operating system;
   transmitting the audio data, from the primary television receiver to a secondary television receiver, wherein:
      the secondary television receiver executes a second operating system that is different from the first operating system; and
      the second operating system comprises a voice command component that is executed locally;
   converting, by the voice command component of the second operating system, the audio data into voice command data;
   after converting the audio data into the voice command data by the voice command component of the second operating system, transmitting, by the secondary television receiver, the voice command data to the primary television receiver;
   in response to receiving the voice command data, transmitting, by the primary television receiver, the voice command data to a voice processing server via the Internet, wherein:
      the secondary television receiver is connected to the Internet via only the primary television receiver;
   receiving, at the primary television receiver from the voice processing server, a command, wherein the command is generated based on the voice command data;
   transmitting, by the primary television receiver to the secondary television receiver, the command; and
   controlling, by the voice command component, an operation of the secondary television receiver based on the command.

2. The method for facilitating smart television content receivers in a local network of claim 1, further comprising:
   receiving, at the voice enabled remote control, a voice command initiation request;
   capturing, by the voice enabled remote control, the audio data; and
   transmitting the audio data from the voice enabled remote control to the primary television receiver.

3. The method for facilitating smart television content receivers in a local network of claim 2, further comprising:
   transmitting, from the voice enabled remote control to the secondary television receiver via the primary television receiver, the voice command initiation request; and
   initiating, by the voice command component, an audio data listener.

4. The method for facilitating smart television content receivers in a local network of claim 1, wherein:
   the primary television receiver includes a television frequency tuner configured to tune to one of a plurality of frequencies corresponding to a plurality of television channels; and
   controlling the operation of the secondary television receiver based on the command comprises:
      generating a tuning request based on the command, the tuning request including a request for the television frequency tuner to tune to a television channel;
      transmitting the tuning request from the secondary television receiver to the primary television receiver;
      tuning the television frequency tuner to a frequency associated with the television channel; and
      transmitting a video stream from the primary television receiver to the secondary television receiver, the video stream being received by the television frequency tuner at the frequency associated with the television channel.

5. The method for facilitating smart television content receivers in a local network of claim 4, wherein:
   the primary television receiver is communicatively coupled with a satellite antenna configured to receive the plurality of frequencies; and
   the primary television receiver receives the video stream from the satellite antenna via a satellite link.

6. The method for facilitating smart television content receivers in a local network of claim 1, wherein the primary television receiver is connected to the secondary television receiver within a local area network separate from the Internet.

7. The method for facilitating smart television content receivers in a local network of claim 1, wherein the primary television receiver and the secondary television receiver are communicatively coupled using a universal serial bus.

8. The method for facilitating smart television content receivers in a local network of claim 1, wherein the primary television receiver and the secondary television receiver are communicatively coupled using a coaxial cable.

9. The method for facilitating smart television content receivers in a local network of claim 1, wherein the primary television receiver and the secondary television receiver are communicatively coupled using a wireless network.

10. The method for facilitating smart television content receivers in a local network of claim 1, wherein the audio data is received by the secondary television receiver in a first format and the method further comprises:
    converting the audio data in the first format to a second format; and
    transmitting the audio data in the second format to the voice command component.

11. A smart television system comprising:
    a primary television receiver operating using a first operating system, wherein the primary television receiver is configured to:
       receive audio data including a recording of a human voice;
       receive voice command data;
       transmit the voice command data to a voice processing server over a wide area network connection; and
       receive a command input from the voice processing server, wherein the command input is generated based on the voice command data;
    a secondary television receiver operating using a second operating system different from the first operating system, the second operating system comprising a voice command module, wherein the secondary television receiver is configured to:
       receive the audio data from the primary television receiver over a local area network connection separate from the wide area network connection;
       convert, by the voice command module, the audio data into voice command data;
       transmit, by the voice command module, the voice command data to the primary television receiver;
       receive, by the voice command module, the command input from the primary television receiver; and
       control, by the voice command module, an operation of the secondary television receiver based on the command input.

12. The smart television system of claim 11, further comprising a voice enabled remote control configured to:
   capture the audio data in response to receiving a voice command initiation request; and
   transmit the audio data to the primary television receiver.

13. The smart television system of claim 11, further comprising a satellite antenna communicatively coupled to the primary television receiver, wherein:
   the satellite antenna is configured to provide a plurality of television channel frequencies to a television frequency tuner of the primary television receiver;
   the secondary television receiver is further configured to:
      generate a tuning request based on the command input, the tuning request including a request for the television frequency tuner to tune to a television channel; and
      transmit the tuning request to the primary television receiver; and
   the primary television receiver is further configured to:
      tune, in response to receiving the tuning request from the secondary television receiver, the television frequency tuner to a television channel frequency of the plurality of television channel frequencies associated with the television channel; and
      transmit a video stream to the secondary television receiver, the video stream being received by the television frequency tuner from the satellite antenna at the television channel frequency.

14. The smart television system of claim 11, further comprising a television communicatively coupled to the secondary television receiver, wherein the secondary television receiver is configured to transmit digital data for display by the television.

15. The smart television system of claim 11, wherein the primary television receiver and the secondary television receiver are communicatively coupled by a universal serial bus.

16. The smart television system of claim 11, wherein the primary television receiver and the secondary television receiver are communicatively coupled by a coaxial cable.

17. A method for facilitating smart television content receivers in a local network, comprising:
   receiving, at a secondary television receiver, audio data from a voice enabled remote control, wherein:
      the audio data comprises human voice; and
      the secondary television receiver comprises a voice command component;
   converting, by the voice command component of the secondary television receiver, the audio data into voice command data;
   after converting the audio data into the voice command data by the voice command component, transmitting, by the secondary television receiver, the voice command data to a primary television receiver;
   in response to receiving the voice command data, transmitting, by the primary television receiver, the voice command data to a voice processing server via the Internet, wherein:
      the secondary television receiver is connected to the Internet via only the primary television receiver;
   receiving, at the primary television receiver from the voice processing server, a command, wherein the command is generated based on the voice command data;
   transmitting, by the primary television receiver to the secondary television receiver, the command; and
   controlling, by the voice command component, an operation of the secondary television receiver based on the command.

18. The method for facilitating smart television content receivers in a local network of claim 17, wherein:
   the primary television receiver includes a television frequency tuner configured to tune to one of a plurality of frequencies corresponding to a plurality of television channels; and
   controlling the operation of the secondary television receiver based on the command comprises:
      generating a tuning request based on the command, the tuning request including a request for the television frequency tuner to tune to a television channel;
      transmitting the tuning request from the secondary television receiver to the primary television receiver;
      tuning the television frequency tuner to a frequency associated with the television channel; and
      transmitting a video stream from the primary television receiver to the secondary television receiver, the video stream being received by the television frequency tuner at the frequency associated with the television channel.

19. The method for facilitating smart television content receivers in a local network of claim 17, further comprising:
   transmitting, from the voice enabled remote control, the audio data to the primary television receiver, wherein the audio data is transmitted to the secondary television receiver via the primary television receiver.

20. The method for facilitating smart television content receivers in a local network of claim 17, wherein the primary television receiver is connected to the secondary television receiver within a local area network separate from the Internet.

* * * * *